United States Patent [19]
Kessler et al.

[11] 3,849,232
[45] Nov. 19, 1974

[54] FALLING FILM EVAPORATOR

[75] Inventors: Gustav Kessler, Malsch; Erich Frank, Karlsruhe; Volker Laumann, Ettlingen, all of Germany

[73] Assignee: Wiegand Karlsruhe GmbH, Ettlingen, Germany

[22] Filed: Mar. 13, 1973

[21] Appl. No.: 340,662

[30] Foreign Application Priority Data
Mar. 16, 1972 Germany.............................. 2212816

[52] U.S. Cl.................................... 159/13 A, 159/43
[51] Int. Cl............................ B01d 1/22, B01d 1/00
[58] Field of Search............ 159/13 R, 13 A, 43 R, , 159/28 D; 202/236; 203/89; 165/115, 118, 109 T

[56] References Cited
UNITED STATES PATENTS

| | | | |
|---|---|---|---|
| 470,060 | 3/1892 | Lillie................................ | 159/13 A |
| 491,659 | 2/1893 | Lillie................................ | 159/13 A |
| 2,758,061 | 8/1956 | Geller............................. | 202/236 X |
| 3,132,064 | 5/1964 | Scheffers........................ | 159/13 A |
| 3,412,778 | 11/1968 | Witt et al........................ | 159/13 A |
| 3,437,124 | 4/1969 | Bryan et al...................... | 159/13 A |

FOREIGN PATENTS OR APPLICATIONS

| | | | |
|---|---|---|---|
| 893,633 | 4/1962 | Great Britain.................... | 159/13 A |
| 1,162,894 | 9/1958 | France............................. | 159/13 A |
| 1,206,643 | 9/1970 | Great Britain.................... | 159/13 A |

*Primary Examiner*—Jack Sofer
*Attorney, Agent, or Firm*—Hans Berman; Kurt Kelman

[57] ABSTRACT

The liquid to be evaporated in the long vertical heating tubes of a falling film evaporator is uniformly distributed over the inner tube walls by means of a receptacle in the feed chamber of the evaporator from which distributor tubes, fewer in number and greater in diameter than the heating tubes, extend toward the upper tube sheet. The inner rim faces bounding the lower orifices of the distributor sheets and discharging the liquid to be discharged may be arranged in various patterns to discharge at least a major portion of the liquid toward the imperforate tube sheet parts between the orifices of the heating tubes, thereby ensuring uniform liquid flow over the walls of all heating tubes.

10 Claims, 6 Drawing Figures

FALLING FILM EVAPORATOR

This invention relates to shell-and-tube heat exchangers of the long-tube vertical type, and particularly to a falling film evaporator equipped with an improved arrangement for uniformly distributing the descending liquid, which is to be evaporated, over the inner walls of the heating tubes.

As is commonly known, the efficiency of a falling film evaporator and often the quality of the concentrate produced are greatly affected by the degree of uniformity with which liquid film thickness in the several heating tubes is maintained. While numerous proposals have been made for distributing the liquid film with uniform thickness (see, for example, German Pat. No. 909,942 and German Published patent application No. 1,519,742), there is ample room for further improvement.

It is a common shortcoming of many known liquid distributing systems that they rely on a multiplicity of narrow ducts or passages for the liquid. If the liquid tends to form scale or carries particulate impurities, the ducts or passages are frequently clogged, and the distributing arrangement requires frequent cleaning. Other known distribution systems rely on precise horizontal alignment of the upper orifices of the heating tubes which is difficult to maintain under severe thermal stresses to which the tubes are exposed.

It is a primary object of the invention to provide a falling film evaporator with a liquid distribution system which avoids the shortcomings of the known devices.

With this object and others in view, as will become apparent hereinafter, the invention provides a falling film evaporator whose shell has an upright axis in the normal operating position of the evaporator. A tube sheet axially bounds a feed chamber in the shell and is formed with spaced openings therethrough. The heating tubes of the evaporator have orifices in the openings of the tube sheet and extend from the tube sheet in an axial direction away from the feed chamber. A receptacle in the feed chamber is fed the liquid that is to be evaporated. Distributor tubes extend axially toward the tube sheet from the receptacle with which they communicate.

Terminal inner rim faces of the distributor tubes bound orifices of the tubes spacedly directed toward the tube sheet. The distributor tubes are substantially smaller in number and substantially greater in orifice cross section than the heating tubes, and at least a portion of the terminal inner rim face of each distributor tube is aligned in the direction of the shell axis with a portion of the tube sheet which is free from openings.

Other features and many of the attendant advantages of this invention will readily be appreciated as the same is better understood from the following detailed description of preferred embodiments when considered in connection with the appended drawing in which.

Figure 1:
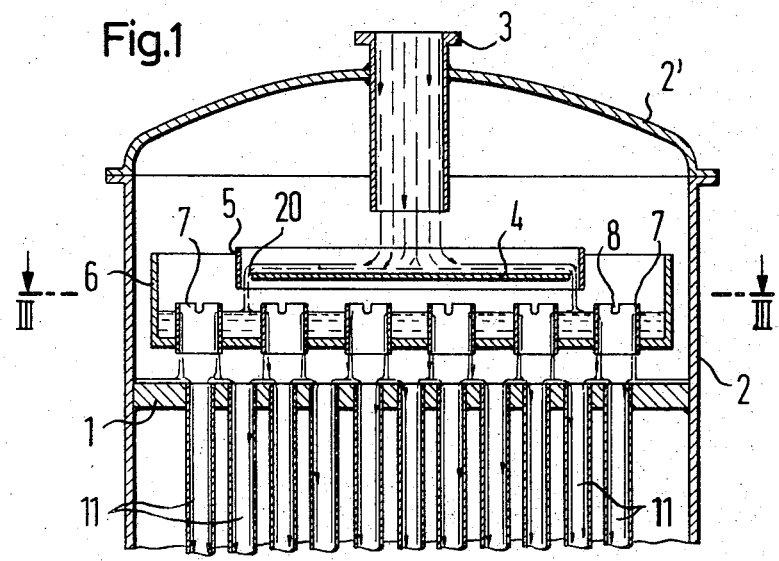
FIG. 1 shows a falling film evaporator of the invention in fragmentary elevational section.

Referring now to the drawing in detail, and initially to FIG. 1, there is seen the upper end of a falling film evaporator, conventional as far as not explicitly shown and described.

The illustrated part of the evaporator includes an upright cylindrical shell 2 upwardly closed by a dished cover 2' flanged to the shell 2. The cover 2' and the upper tube sheet 1 of the evaporator bound a feed chamber. The liquid to be evaporated is fed to the evaporator through a vertical feed pipe 3 coaxially sealed into the cover 2' above a circular horizontal baffle plate 4. A baffle 5 having the shape of a short cylindrical tube coaxial with the baffle plate 4 and the shell 2 surrounds the baffle plate 4 and is separated from the same by a narrow annular gap 20.

The baffle plate 4 and the tubular baffle 5 are attached to the rim of a shallow circular trough 6 by spiders, not themselves shown. Short upright distributor tubes 7 are set into the flat bottom of the trough 6 in a pattern of intersecting, evenly spaced rows and columns. Each cylindrical tube 7 projects downward from the bottom of the trough 6, and much farther upward into the interior of the trough. The tubes 7 are identical in shape and size, and identically set into the trough 6. The rim about the upper orifice of each tube 7 has several notches 8.

The lower orifices of the distributor tubes 7 are axially spaced from the tube sheet 1 toward which they are directed, and each relatively wide tube 7 is coaxial with one of the cylindrical, much narrower heating tubes 11 which are set into respective openings of the tube sheet 1, the upper orifices of the tubes 11 being flush with the top surface of the sheet 1 in the coaxial openings of the latter. Other heating tubes 11 are arranged between those coaxial with the tubes 7.

Figure 2:
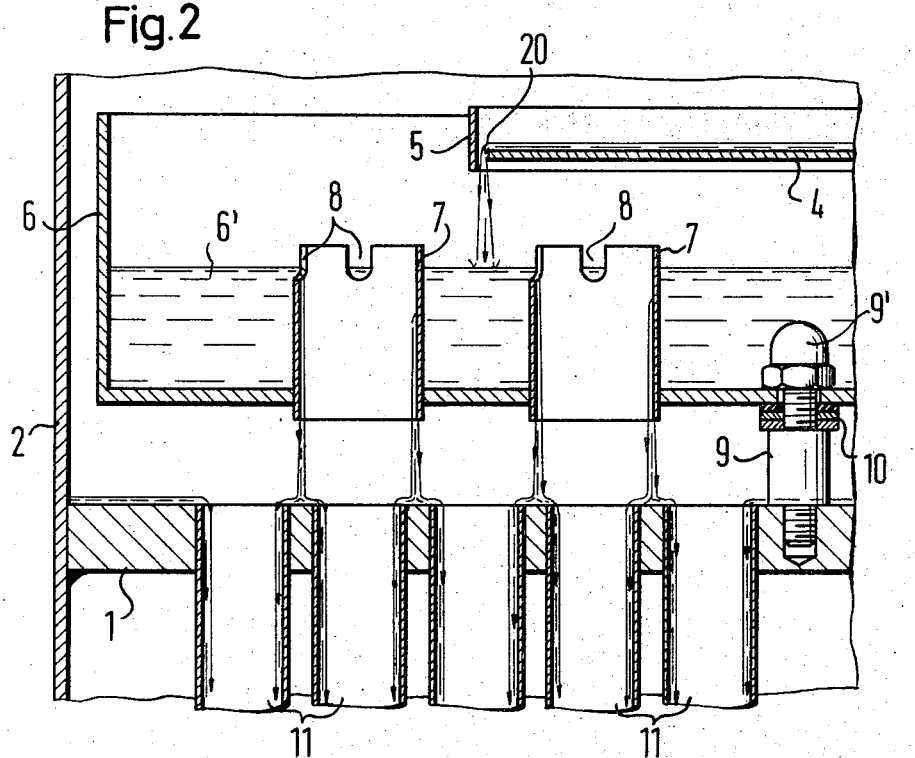
FIG. 2 illustrates a portion of the apparatus of FIG. 1 on a larger scale.

As is shown in FIG. 2, but has been omitted from FIG. 1 in order not to crowd the drawing, the tube sheet 1 is welded to the shell 2, and the trough 6 is mounted on the tube sheet by means of at least three spaced supports, each including an upright cylindrical column 9 from which two integral threaded studs extend in opposite axial directions. One stud is screwed into the tube sheet 1. The other stud carries washers 10 and passes through an opening in the bottom wall of the trough 6. At least one of the washers 10 consists of elastomeric material to prevent leakage from the trough 6 along the column 9. A cap nut 9' on the column 9 in the trough 6 presses the trough against the washers 10.

The portion of the evaporator not seen in FIGS. 1 and 2 includes the steam and condensate pipes to the portion of the shell 2 surrounding the heating tubes 11, the lower tube sheet, and the vessel below the lower tube sheet in which the concentrated liquid is collected, and from which the vapors are discharged, also valves, pumps, and gages required for normal operation and entirely conventional in themselves.

Prior to operation of the evaporator, the bottom wall of the trough 6 is adjusted to a precisely horizontal position by placing a suitable number of washers 10 on each column 9, and further adjusting the effective height of each support by tightening the nut 9' against the partly resilient washers. This adjustment of the trough 6 brings the several notches 8 into precise horizontal alignment.

The gap 20 and the tubes 7 are so located that the liquid discharged from the feed pipe 3 and distributed by the baffles 4, 5 is discharged directly into the body of liquid 6' for which the trough 6 provides a receptacle, and avoids the upper orifices of the distribution tubes 7. Liquid enters the tubes 7 only through the passages provided by the notches 8 at a uniform rate, is distributed by surface tension effects over the inner walls of the tubes, and discharged over the entire inner rim face which bounds the lower orifice of each tube 7.

In the tube arrangement illustrated in FIGS. 1 and 2, the descending liquid hits the imperforate annular portion of the tube sheet 1 around a tube 11 which is axially aligned with the afore-mentioned inner rim face. From there, the liquid flows into the tube 11 axially aligned with the distributing tube 7 from which the liquid is discharged, but also into other tubes not so aligned, and adequate uniformity is often achieved in an arrangement in which heating tubes 11 axially aligned with wider distributing tubes 7 alternate in each row and in each column with unaligned heating tubes, the rows and column intersecting each other at right angles in a manner evident from FIGS. 1 and 2, but not specifically illustrated.

Evan more uniform liquid films in the heating tubes are achieved if the orifices of the heating tubes are arranged in the tube sheet 1 at the intersections of three groups of parallel, uniformly spaced lines offset 60° from each other so as to define a pattern of triangles whose corners are located in the axes of the heating tubes or in the centers of their orifices or of the openings of the tube sheet 1. Two examples of distributor tube arrangements in cooperation with a tube sheet of the last-described type are shown in FIGS. 3 and 4, and it will be understood that the illustrated uniform distribution of the heating tube orifices in the tube sheet 1 and of the distributor tubes in the trough or receptacle 6 extends over the portions of the structure omitted from FIGS. 3 and 4, except for peripheral areas, as is seen in the drawing.

Figure 3:
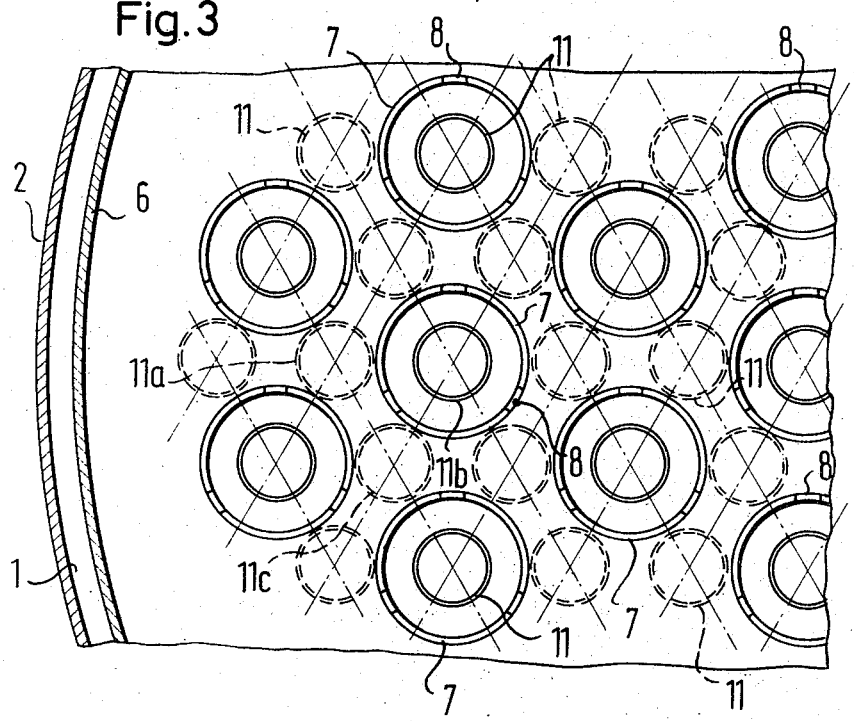
FIG. 3 shows a modified evaporator of the invention in plan section on a plane corresponding to the line III—III in FIG. 1.

Referring initially to FIG. 3, it is seen that the centers or axes of each group of three adjacent heating tubes 11, such as the tubes referenced 11a, 11b, 11c, define an equilateral triangle. A distributor tube 7 is coaxial with the much narrower heating tube 11b, and the upper rim of the coaxial tube 7 has three equiangularly distributed notches 8, one of the notches being aligned with the center of the triangle defined by the tubes 11a, 11b, 11c, or the associated openings in the tube sheet. The liquid which enters the tube 7 coaxial with the tube 11b through the notch aligned with the center of the triangle reaches the tubes 11a, 11b, 11c in fairly precisely uniform amounts. Any non-uniformity in this respect that may be caused by lack of precise horizontal positioning of the tube sheet 1 is compensated for by the fact that the triangle pattern described is repeated all over the trough 6 and the tube sheet 1. Each heating tube coaxial with a distributing tube receives its share of liquid from the coaxial tube regardless of the precise position of the tube sheet, and each other heating tube, except those at the very periphery of the pattern, is centered between three distributor tubes 7, the resulting uniform liquid distribution being evident.

Figure 4:
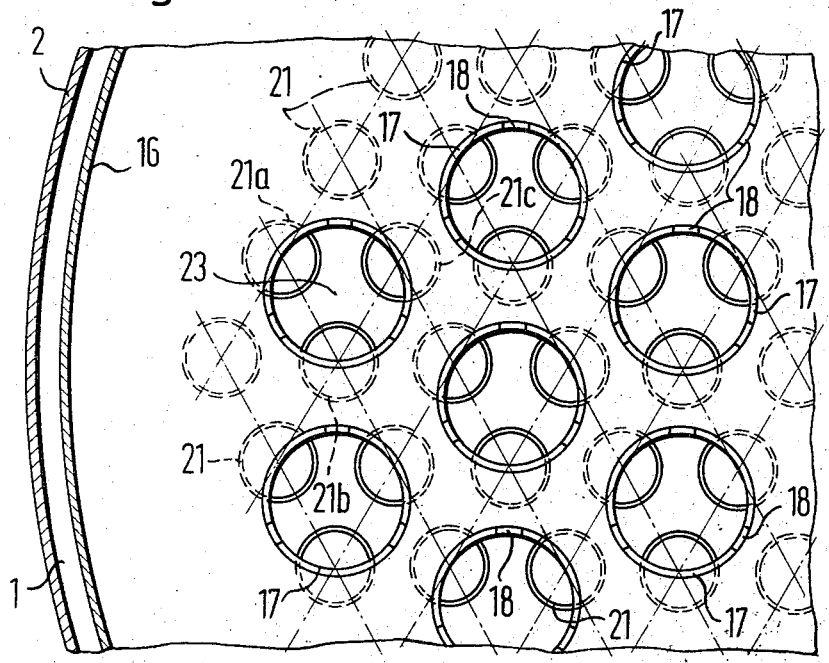
FIG. 4 shows another modification of the evaporator in a view corresponding to that of FIG. 3.

In the embodiment of the invention illustrated in FIG. 3, the liquid-discharging inner rim faces at the bottom of the tubes 7 are axially aligned with imperforate portions of the tube sheet 1 only, but equivalent results can be achieved in arrangements in which only a portion of each inner rim face about the lower orifice of a distributor tube is aligned axially with a portion of the tube sheet 1 which is free from openings, as is illustrated, by way of example, in FIG. 4.

The heating tubes 21 are arranged in the tube sheet as in FIG. 3 so that their axes or the centers of their orifices define equilateral triangles. The distributor tubes 17, much larger in diameter than the heating tubes 21, are arranged in such a manner that the axis 23 of each distributor tube intersects the tube sheet at the center of the triangle defined by three directly adjacent openings in the tube sheet 1 or orifices of heating tubes 21, as specifically indicated for the tubes 21a, 21b, 21c in FIG. 4.

The three notches 18 in each distributor tube are aligned with imperforate portions of the tube sheet so that a minor portion of the liquid discharged from the lower orifice of each distributor tube falls directly into one of the three associated heating tubes 21, while the bulk drops on the imperforate tube sheet portions and is distributed from there over the inner faces of the heating tubes 21.

While this may not immediately be apparent from FIG. 3, the number of heating tubes in both FIGS. 3 and 4 is 3 times the number of distributor tubes, the relationship being not necessarily precise because of the exceptions in the patterns at the peripheries of the apertured tube sheet areas.

Figure 5:
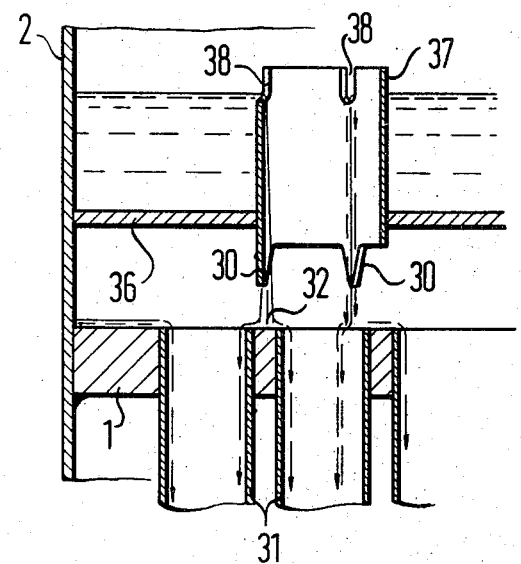
FIG. 5 illustrates a further modification of the evaporator of FIG. 1 in a view analogous to that of FIG. 2.
Figure 6:
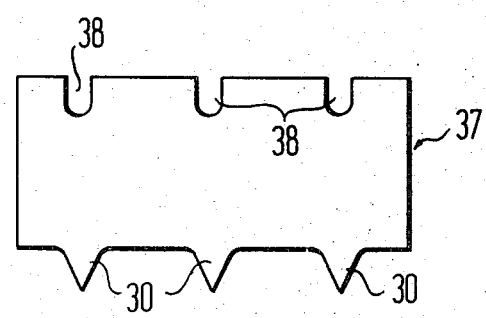
FIG. 6 is a developed view of a distributor tube in the apparatus of FIG. 5.

The further modification of the evaporator of the invention illustrated in FIGS. 5 and 6 relates mainly to the distributor tubes, and the evaporator may otherwise be identical with the embodiments described above with reference to FIGS. 1 to 4.

As is best seen from the developed view of FIG. 6, the modified distributor tubes 37 have three notches 38 equiangularly distributed in the rims about their upper orifices as described above. Three lugs 30 project from the lower rim of each tube 37 in axial alignment with respective notches 38 and have each the shape of an equilateral triangle whose apex points straight down in an axial direction.

Liquid is discharged from the distributor tube 37 not in a stream having the general shape of a hollow cylinder, as in the devices of FIGS. 1 to 4, but in three discrete streams which may be aimed precisely toward the imperforate centers 32 of triangular patterns of heating tubes 31 described in detail with reference to FIGS. 3 and 4.

The apparatus of FIG. 5 further differs from the first-described embodiments of the invention by being provided with a liquid receptacle bounded in a radially outward direction by the shell 2 itself, and in an axially downward direction by a radial partition 36 fixedly fastened in the shell 2 if necessary arrangements can be made to keep the axis of the shell in a constant, preferably precisely vertical position. However, the partition 36 may be mounted on the tube sheet 1 by means of at least three supports, as described with reference to FIG. 2, and leakage between the partition 36 and the shell 2 may be minimized by a resilient gasket or the like, some liquid flow past the partition 36 along the shell 2 being permissible, as is illustrated in FIG. 5.

Other modifications and variations of the illustrated devices will readily suggest themselves to those skilled in the art. Although the trough 6, 16, and the partition 36 are not subject to direct heating by the steam admitted to the shell 2, some evaporation may take place from the surface of the liquid in the recepatacle, and it may be desireable to drain the latter of its contents from time to time. It has been found convenient to set at least one distributor tube 7, 17, 37 loosely into the associated receptacle, and to maintain its vertical position by means of an external radial flange or collar so that the receptacle may be emptied by simply withdrawing the releasably mounted distributor tube.

Such an arrangement is particularly desirable when the liquid is admitted to the shell 2 in superheated condition so that vapor is released from the liquid adjacent the baffle plate 4 and the tubular baffle 5, but the residual liquid is at its boiling point at the prevailing pressure when it enters the receptacle 6, 16, 36.

It should be unterstood, therefore, that the foregoing disclosure relates only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:

1. A falling film evaporator comprising, in combination:
    a. a shell having an axis upright in the normal operating position of said evaporator;
    b. a transverse tube sheet forming the floor of a feed chamber in said shell,
        1. said tube sheet being formed with a plurality of spaced openings therethrough;
    c. a plurality of heating tubes received in said openings and axially extending from said sheet away from said feed chamber, said heating tubes having respective orifices axially open toward said feed chamber;
    d. a receptacle in said feed chamber;
    e. a plurality of distributor tubes axially extending from said receptacle toward said tube sheet and communicating with said receptacle,
        1. respective annular terminal lower faces of said distributor tubes bounding orifices of said distributor tubes spacedly directed toward said tube sheet,
        2. the number of said distributor tubes being substantially smaller than the number of said heating tubes,
        3. the cross section of said orifice of each distributing tube being substantially greater than the cross-section of said orifice of each heating tube,
        4. at least a portion of each of said faces being aligned in the direction of said axis with a portion of said tube sheet free from said openings; and
    f. feed means for feeding the liquid to be evaporated to said receptacle.

2. An evaporator as set forth in claim 1, wherein said receptacle has a bottom wall transverse to said axis, and said distributor tubes are fixedly fastened to said bottom wall, the evaporator further comprising adjusting means for adjusting the angular relationship of said bottom wall relative to said axis.

3. An evaporator as set forth in claim 1, wherein said orifices of said heating tubes are flush with said tube sheet.

4. An evaporator as set forth in claim 1, wherein the number of said heating tubes is approximately three times the number of said distributor tubes.

5. An evaporator as set forth in claim 4, wherein the centers of each group of three directly adjacent openings in said tube sheet define a triangle, and each distributor tube has an axis substantially parallel to the axis of said shell and passing through one of said centers.

6. An evaporator as set forth in claim 4, wherein said openings are substantially uniformly distributed in said tube sheet, and said distributor tubes are substantially uniformly distributed in a plane perpendicular to said axis through said receptacle.

7. An evaporator as set forth in claim 4, wherein the centers of each group of three directly adjacent openings in said tube sheet define a triangle, and respective portions of each of said faces are aligned in the direction of said axis with the centers of a plurality of said triangles.

8. An evaporator as set forth in claim 7, further comprising a guide lug projecting from each of said portions of said faces in the direction of said axis toward the aligned center of one of said triangles.

9. An evaporator as set forth in claim 2, wherein each distributor tube is formed with a plurality of passages connecting the interior of said distributor tube with said receptacle transversely to said axis.

10. An evaporator as set forth in claim 9, wherein said passages are aligned with respective centers of said triangles in the direction of said axis.

* * * * *